United States Patent Office 3,211,671
Patented Oct. 12, 1965

3,211,671
OXIDATION CATALYST
Robert B. Egbert, Stamford, Conn., assignor to Chemical Process Corporation, Hamilton, Conn., a corporation of Massachusetts
No Drawing. Continuation of application Ser. No. 820,861, June 17, 1959. This application July 16, 1962, Ser. No. 210,202
5 Claims. (Cl. 252—437)

This application is a continuation of Serial No. 820,861, filed June 17, 1959, entitled, "Oxidation Catalyst," now abandoned.

The present invention is directed to the production of catalysts of the vanadium-molybdenum type, more particularly to catalysts especially adapted for high efficiency of conversion of benzene to maleic anhydride.

It has been known that a catalyst consisting essentially of a mixture of the oxides of vanadium and molybdenum, and supported on a ceramically bonded fused alumina support having a low surface area and a high porosity, may be used in the oxidation of benzene to maleic anhydride. It has now been found that a catalyst of this composition is not very active or efficient as it does not bring about nearly complete conversion of the benzene at temperatures of about 760° F. or less. While the efficiency is increased at higher temperatures, such high temperatures cause rapid deterioration of the catalyst, so that the life thereof becomes too short for economical operation.

To overcome these deficiencies, it has been proposed to add a small proportion of phosphorus pentoxide in the form of phosphoric acid, in the absence of alkali and alkali earth metals to a catalyst of the oxides of vanadium and molybdenum. The catalyst gave poor yields of maleic anhydride and the conversion of benzene was low. High temperatures were necessary, greatly reducing the life of the catalyst.

The present invention is intended and adapted to overcome the disadvantages and difficulties encountered in the prior art, it being among the objects thereof to provide a catalyst of the above described character which is capable of bringing about substantially complete conversion of benzene at relatively low temperatures and below about 760° F.

It is also among the objects of the invention to provide such a catalyst which exhibits a high efficiency of reaction to produce maleic anhydride from benzene with excellent yields.

The basis of the present invention is the discovery that the addition of certain promoters, namely oxides of nickel, cobalt or iron, combined with the addition of phosphoric acid plus sufficient sodium, lithium, calcium or strontium to equal or exceed the amount of sodium, lithium, calcium or strontium required to produce the tribasic salt of phosphoric acid, results in a considerable improvement in yield. The results are surprising in that neither the first group, namely nickel, cobalt or iron, nor the second group of sodium, lithium, barium or strontium, nor phosphoric acid alone, nor any combination of two of the three groups alone, produce the desired results (namely, increased selectivity and yield). The results are further surprising in that the other alkali or alkaline earth metals such as potassium, rubidium, cesium, magnesium or barium, cannot be substituted for the four mentioned above. They have either no effect or are actually harmful as in the case with rubidium and cesium. It is also surprising that the phosphoric acid must not exceed that corresponding to the tribasic salt of the sodium, lithium, calcium or strontium. Of the three elements, nickel, iron and cobalt, the cobalt and the iron are the more effective in increasing both the yield and the activity. When the preferred catalyst is used the addition of cobalt or iron in place of nickel increases the yield by 15%.

It is also possible, and even desirable, to use mixtures of two or more of the four alkali and alkaline earth metal oxides with the addition of cobalt or iron oxide and phosphorous pentoxide. Large amounts of these combined promoters are unnecessary; less than 10% of the total vanadium-molybdenum oxides suffice to produce an active catalyst. A catalyst composition which has been found quite effective has the following active constituents in parts by weight:

| | |
|---|---|
| Vanadium pentoxide | 8.7 |
| Molybdenum trioxide | 5.4 |
| Cobalt oxide | .34 |
| Sodium oxide | .26 |
| Phosphorus pentoxide | .15 |
| Inert base or carrier | 85.15 |
| Total | 100.00 |

In practicing the invention, the following procedure was used in preparing the various catalysts:

The desired amount of molybdenum oxide was introduced by dissolving ammonium molybdate in concentrated hydrochloric acid. Then the desired amount of ammonium vanadate was dissolved in the solution. The cobalt was introduced by dissolving cobalt nitrate in the solution. The alkali and/or alkaline earth metal promoter and phosphoric compounds may be introduced in any suitable form, for instance, sodium in the form of sodium chloride, the phosphorus in the form of phosphoric acid or phosphorus pentoxide, or both may be introduced as trisodium phosphate.

The resulting solution of the mixture of compounds was mixed with granules of ceramically bonded fused porous alumina, and subjected to evaporation, resulting in the deposition of the catalytic materials on the surface and in the pores of the support or carrier. The catalyst carrier was then calcined in the presence of air in a kiln held at a constant temperature of about 750° F.

For practical operating reasons it is necessary to employ a support material to retain the catalyst in the reactor as the active catalyst itself prepared in the manner described above in the absence of a carrier would be a very fine crystalline powder which would be carried away by the flowing air-benzene mixture. This carrier material is itself not critical as long as it is insoluble in the concentrated acid used to make the catalyst. It needs to be sufficiently porous so that the reaction gases can diffuse in and out of the support. An ideal support is made by ceramically bonding alumina, quartz, or silicon carbide grains in such a manner that large pores are left—having diameters of 50–150 microns, or larger.

The following are specific examples of catalysts made in accordance with the present invention by the above procedure:

EXAMPLE 1

A catalyst was made up having the following composition, the percentages of the constituents being by weight:

| | Percent |
|---|---|
| Vanadium (as $V_2O_5$) | 8.7 |
| Molybdenum ($MoO_3$) | 5.4 |

450 liters per hour of air containing 1.25% by volume of benzene were passed over 170 cc. of catalyst contained in a stainless steel tube having an outside diameter of ¾″ and a wall thickness of 0.065 inch (16 BWG). The tube was surrounded by a heat sink consisting of a block of aluminum in a 6″ stainless steel tube which was heated so as to maintain a uniform and constant temperature of 700° F. The conversion of benzene was 28 mol %, and the yield was 19.3 mol %. Increasing the temperature to 760° F. increased the conversion to only 33.0% and the yield to 24.2%.

In these examples the following definitions are employed:

Conversion=
$$\frac{\text{Mols benzene oxidized}}{\text{Mols benzene fed}}$$

Yield=
$$\frac{\text{Mols benzene converted to maleic anhydride}}{\text{Mols benzene fed}}$$

Efficiency=
$$\frac{\text{Mols benzene converted to maleic anhydride}}{\text{Mols benzene oxidized}}$$

EXAMPLE 2

A catalyst similar to that of Example 1 was made up with cobalt added as a promoter. It had the following composition:

| | Percent |
|---|---|
| Vanadium (as $V_2O_5$) | 8.3 |
| Molybdenum (as $MoO_3$) | 3.9 |
| Cobalt (as $CoO_3$) | 0.32 |

Oxidation of the benzene was conducted by the procedure described in Example 1, at 700° F. The conversion was 21.5% and the yield was 12%. At 760° F. the conversion increased to 34.5% and the yield to 22.4%.

Both of the above catalysts are too inactive for commercial use. It is also seen that the addition of cobalt produced no appreciable effect.

EXAMPLE 3

A catalyst similar to that of Example 1 was made up except that lithium oxide was incorporated into the catalyst. It had the following composition:

| | Percent |
|---|---|
| Vanadium (as $V_2O_5$) | 8.7 |
| Molybdenum (as $MoO_3$) | 5.4 |
| Lithium (as $Li_2O$) | 0.17 |

When tested under conditions similar to Example 1, the conversion at 700° F. was 68% and the yield was 47%. At 760° F. the conversion was 90% and the yield 55%.

EXAMPLE 4

A catalyst similar to that of Example 3 was made up except sodium oxide was used as a promoter. It had the following composition:

| | Percent |
|---|---|
| Vanadium (as $V_2O_5$) | 8.7 |
| Molybdenum (as $MoO_3$) | 5.4 |
| Soduim (as $Na_2O$) | 0.5 |

When tested under conditions identical to Example 1, the following results were obtained. At 700° F. the conversion was 60.5% and the yield 54.8%. At 760° F. the conversion was 87.8% and the yield 69%.

EXAMPLE 5

A catalyst was made up using calcium oxide as a promoter. It had the following composition:

| | Percent |
|---|---|
| Vanadium (as $V_2O_5$) | 8.7 |
| Molybdenum (as $MoO_3$) | 5.4 |
| Calcium (as CaO) | 0.53 |

At 700° F. the conversion was 71% and the yield was 47.8%. At 740° F. the conversion was 93.1% and the yield 65.6%.

EXAMPLE 6

A catalyst was made up using stronium chloride as a promoter, having the following composition:

| | Percent |
|---|---|
| Vanadium (as $V_2O_5$) | 8.7 |
| Molybdenum (as $MoO_3$) | 5.4 |
| Strontium (as SrO) | 0.9 |

At 700° F. the conversion was 65% and the yield was 42%. At 740° the conversion was 86% and the yield was 55.5%.

Other promoters were tried, and the results are tabulated in the following tables Tables I-A and I-B.

Table I-A.—Catalysts containing 8.7% $V_2O_5$ and 5.4% $MoO_3$

| Promoter | Concentration wt. percent (as oxide) | Conversion, percent | | Yield, percent | |
|---|---|---|---|---|---|
| | | 700° F. | 760° F. | 700° F. | 760° F. |
| Potassium | 0.75 | 30.6 | 46 | 26.4 | 35 |
| Rubidium | 0.78 | 17.7 | 42 | 16.7 | 27 |
| Cesium | 1.13 | 13.6 | 24 | 11.1 | 15 |
| Magnesium | 0.39 | 31.9 | 39 | 27.4 | 39 |
| Barium | 1.17 | 20.6 | 22.9 | 33.2 | 50 |

Table I-B.—Catalysts containing 8.3% $V_2O_5$, 3.9% $MoO_3$ and 0.32% $Co_2O_3$

| Promoter | Concentration wt. percent (as oxide) | Conversion, percent | | Yield percent | |
|---|---|---|---|---|---|
| | | 700° F. | 760° F. | 700° F. | 760° F. |
| Potassium | 0.75 | 27.5 | 37 | 17 | 22 |
| Rubidium | 0.78 | 11.7 | 27 | 5.6 | 19 |
| Cesium | 1.13 | 10.3 | 27 | 7.2 | 18 |
| Magnesium | 0.39 | 27 | 55 | 17 | 36 |
| Barium | 1.17 | 17 | 25 | 34 | 35 |

As can be seen from the above examples, the addition of lithium sodium, calcium or strontium oxides is beneficial to the activity and yield of the catalyst, while the other alkali and alkaline earth metal oxides have little effect or are even detrimental. Also the addition of cobalt to the unpromoted catalyst or to catalysts made using the promoters listed in Table I above has little or in some cases a deleterious effect. Likewise, the addition of cobalt had little or no effect on catalysts promoted with lithium, sodium, calcium and strontium. The effect of cobalt on these catalysts is tabulated below in Table II.

Table II.—Effect of cobalt on catalyst activity and yield

[Catalysts containing 8.7% $V_2O_5$ and 5.4% $MoO_3$]

| Promoters | Temp., °F. | Conversion, percent | Yield, mol percent |
|---|---|---|---|
| 0.5% sodium oxide | 650 | 28.5 | 22.4 |
| 0.5% sodium oxide; 0.32% cobalt oxide | 650 | 30.0 | 21.3 |
| 0.5% sodium oxide | 760 | 87.8 | 69.0 |
| 0.5% sodium oxide; 0.32% cobalt oxide | 760 | 94.1 | 68.0 |
| 0.17% lithium oxide | 680 | 60.0 | 41.6 |
| 0.17% lithium oxide; 0.32% cobalt oxide | 680 | 59.5 | 41.6 |
| 0.53% calcium oxide | 735 | 93.1 | 65.6 |
| 0.53% calcium oxide; 0.32% cobalt oxide | 735 | 92.9 | 62.8 |
| 0.9% strontium oxide | 740 | 86.1 | 55.5 |
| 0.9% strontium oxide; 0.32% cobalt oxide | 735 | 92.9 | 62.8 |

Likewise, the addition of phosphorous pentoxide has no beneficial effect and is indeed in some cases deleterious. Table III below tabulates results obtained when phosphorous pentoxide was added to various catalysts.

*Table III.—Effect of phosphorous pentoxide on the activity of the catalyst prepared as in Example 1*

[Catalysts containing 8.3% $V_2O_5$ and 3.9% $MoO_3$]

| Promoters | Temp., °F. | Conversion, percent | Yield, mol percent |
|---|---|---|---|
| None | 700 | 28.0 | 19.3 |
| None | 760 | 33.0 | 24.2 |
| 0.088% $P_2O_5$ | 700 | 12.5 | 8.5 |
|  | 760 | 10.4 | 8.4 |
| 0.5% sodium oxide | 700 | 70.0 | 54.8 |
|  | 760 | 87.8 | 69.0 |
| 0.11% sodium oxide; 0.088% $P_2O_5$ | 700 | 18.0 | 12.3 |
|  | 760 | 98.8 | 68.5 |
| 0.61% sodium oxide; 0.088% $P_2O_5$ | 700 | 49.5 | 41.1 |
|  | 760 | 88.0 | 62.3 |
| 0.16% lithium oxide | 700 | 77.8 | 54.2 |
| 0.069% lithium oxide; 0.14% $P_2O_5$ | 700 | 21.0 | 12.8 |
| 0.088% $P_2O_5$; 0.32% $CoO_3$ | 722 | 36.0 | 5.7 |
|  | 752 | 32.5 | 7.1 | ing them both to the basic molybdenum vanadium oxide catalyst in the absence of these promoters decreases the yield greatly with very low efficiencies. Referring to Table III it can be seen that conversion of the unpromoted catalyst is unchanged but the yield was decreased by a factor of between three and four.

To compare the relative effectiveness of iron, nickel and cobalt as promoters in the presence of phosphoric acid and sufficient sodium oxide to form the tribasic salt of phosphoric acid, a long term test was run. Identical quantities of vanadium, molybdenum, phosphorous and sodium were used. The comparison was made in a multi-tube reactor with identical temperatures, flowrates and benzene concentrations to each one. The benzene concentration was held at 1.2 percent. The space velocity was 2400 standard cu. ft. of gas-benzene mixture per cu. ft. reactor volume. The results are summarized in Table V.

*Table V.—Comparison of nickel, iron and cobalt promoted catalyst*

| Elapsed Time | Initial | | 372 hrs. | | 500 hrs. | | 644 hrs. | | 690 hrs. | | 982 hrs. | | 1,024 hrs. | |
|---|---|---|---|---|---|---|---|---|---|---|---|---|---|---|
| Temperature | 700° F. | | 715° F. | | 715° F. | | 715° F. | | 728° F. | | 744° F. | | 754° F. | |
|  | Conversion | Yield, mol percent | Conv. | Yield | Conv. | Yield | Conv. | Yield | Conv. | Yield | Conv. | Yield | Conv. | Yield |
| Nickel promoted catalyst | 57.2 | 39 | 86.3 | 53.0 | 78.8 | 57.5 | 73.3 | 53.2 | 83.8 | 63 | 92.5 | 67 | 94.2 | 65.7 |
| Cobalt promoted catalyst | 60.3 | 49 | 91.1 | 64.8 | 84.3 | 65.6 | 79.5 | 61.5 | 89.5 | 69 | 94.2 | 70.5 | 96.3 | 73.0 |
| Iron promoted catalyst | 91 | 72.3 | 89.4 | 63.8 | 83.4 | 64.3 | 79.7 | 61.5 | 88.3 | 72.3 | 92.8 | 73.4 | 96.8 | 74.7 |

However, if both cobalt and phosphorous pentoxide are employed as promoters, the yields obtained with catalysts above promoted with lithium, sodium, calcium or strontium are enhanced. Table IV below tabulates some results obtained with these triply promoted catalysts under identical conditions of benzene concentration, contact time etc.

*Table IV.—Catalyst containing 8.3% to 8.7% $V_2O_5$ and 3.9% to 5.4% $MoO_3$*

| Promoters | Temp., °F. | Conversion, percent | Yield, mol percent |
|---|---|---|---|
| 0.5% sodium oxide | 700 | 70 | 54.8 |
|  | 760 | 87.8 | 69.0 |
| 0.11% $Na_2O$; 0.088% $P_2O_5$; 0.32% $CoO_3$ | 700 | 68 | 56.0 |
|  | 760 | 96.7 | 80.6 |
| 0.36% $Na_2O$; 0.088% $P_2O_5$; 0.32% $CoO_3$ | 700 | 95.3 | 75.8 |
| 0.16% lithium oxide | 700 | 77.8 | 54.2 |
| 0.069% $Li_2O$; 0.14% $P_2O_5$; 0.32% $CoO_3$ | 700 | 80.4 | 63.7 |
|  | 730 | 94.2 | 74.0 |
| 0.53% $CaO$ | 740 | 93.6 | 65.6 |
| 0.25% $CaO$; 0.21% $P_2O_5$; 0.32% $CoO_3$ | 760 | 97.4 | 70.8 |
| 0.25% $CaO$; 0.21% $P_2O_5$; 0.16% $Li_2O$; 0.32% $CoO_3$ | 710 | 99.0 | 71.3 |
| 0.53% $CaO$; 0.11% $Na_2O$; 0.088% $P_2O_5$; 0.32% $CoO_3$ | 745 | 96.5 | 79.5 |

The beneficial result of adding cobalt oxide and phosphorous pentoxide to the alkali and alkaline earth promoters is indeed surprising in light of the fact that adding them both to the basic molybdenum vanadium oxide catalyst in the absence of these promoters decreases the yield greatly with very low efficiencies.

The proportions of the various promoters can vary over fairly wide limits. The ratio of molybdenum oxide to vanadium pentoxide can vary over a fairly wide range, from 0.25 to 1.5. The preferred range is 0.4 to 1.0. Most of the catalysts described in the examples above had a ratio $MoO_3/V_2O_5=0.67$.

The amount of alkali metal or alkaline earth oxide can vary from 0.5% to 10% of the total active oxides present. They can be present separately or in any combination of each other. The preferred amounts lie between 1.0 and 6.0%.

The amount of cobalt oxide can also be varied over the range of 0.5 to 10% of the total active materials with a preferred range of 1.5 to 5%.

The proportion of active material on the support depends considerably on what support is used. With the fused aluminum oxide supports studied the minimum amount of active materials should be 5% of the weight of the support with preferred range between 8 and 15%.

The proportions of phosphorous pentoxide are critical. The amount of phosphorous pentoxide must always be equal to or less than that required to form the tribasic salt with the alkali or alkaline earth metal oxide.

In the above examples the alkali promoters have been tabulated as the oxides. This was merely done for convenience. The true composition of the catalyst is unknown or could consist of complex salts of alkali or alkaline earth metal, cobalt phosphorous, molybdenum and vanadium such as cobalt phospho-molybdate, etc. Inasmuch as the catalyst were prepared from hydrochloric acid solutions, the alkali metals and their oxides could also be present as the chloride salts.

Most of the catalysts above were prepared from solutions in hydrochloric acid. However, this is not critical nor necessary to produce a good catalyst. Oxalic acid gave identical catalyst to that prepared from hydrochloric acid. Other acids could also be used. The advantage of hydrochloric acid is the fact that the various metal salts are quite soluble in it, permitting the thorough impregnation of the support, and the excess acid is easily removed by evaporation of the solution.

I claim:
1. A catalyst for the oxidation of benzene to maleic anhydride which consists essentially of a mixture of oxides of molybdenum and vanadium and containing as promoter—
    (1) the oxide of an alkaline metal taken from the group consisting of sodium, lithium, calcium and strontium in an amount of 1.0% to 5% of the total oxides of molybdenum and vanadium,
    (2) an amount of phosphorus pentoxide not more than that corresponding to the tribasic salt of said alkaline metal and not less than one-tenth of said amount,
    (3) and the oxide of a heavy metal taken from the class consisting of cobalt and iron in an amount from one-half to twice the amount of said alkaline metal oxides.
2. An oxidation catalyst according to claim 1 characterized in that a mixture of at least two of said alkaline metal oxides is present.
3. An oxidation catalyst according to claim 1 characterized in that the amount of phosphorus pentoxide is about one-half of that required for said tribasic salt.
4. An oxidation catalyst according to claim 1 characterized in that the oxides present are those of molybdenum, vanadium, cobalt, sodium and phosphorus.
5. An oxidation catalyst for the oxidation of benzene to maleic anhydride consisting essentially of the following active constituents in the approximate proportions by weight:

| | |
|---|---|
| Molybdenum oxide | 8.7 |
| Vanadium oxide | 5.4 |
| Cobalt oxide | .34 |
| Sodium oxide | .26 |
| Phosphorus pentoxide | .15 |

References Cited by the Examiner

UNITED STATES PATENTS

| | | | |
|---|---|---|---|
| 2,691,037 | 10/54 | Bellringer et al. | 252—435 X |
| 2,967,185 | 1/61 | Becker et al. | 252—437 X |
| 3,086,026 | 4/63 | Wiebusch | 252—437 X |

MAURICE A. BRINDISI, *Primary Examiner.*